United States Patent [19]

Wolf et al.

[11] 4,316,738
[45] Feb. 23, 1982

[54] ECONOMICAL PROCESS FOR PRODUCING METAL PARTICLES FOR MAGNETIC RECORDING

[75] Inventors: Irving W. Wolf, Los Altos; Michael K. Stafford, Santa Clara; Hillard M. Kahan, San Francisco; William F. Acebo, Hayward; Lawrence M. Scott; Yu C. Lee, both of Newark, all of Calif.

[73] Assignee: Ampex Corporation, Redwood City, Calif.

[21] Appl. No.: 152,899

[22] Filed: May 23, 1980

Related U.S. Application Data

[63] Continuation-in-part of Ser. No. 89,783, Oct. 31, 1979, which is a continuation of Ser. No. 8,948, Feb. 2, 1979, abandoned.

[51] Int. Cl.$^3$ .................................................. B22F 9/00
[52] U.S. Cl. ...................................... 75/0.5 BA; 75/34
[58] Field of Search .................... 75/0.5 B, 0.5 BA, 3, 75/33–37, 0.5 A, 0.5 AA; 106/308 B; 148/31.57; 252/62.50

[56] References Cited

U.S. PATENT DOCUMENTS

| | | | |
|---|---|---|---|
| 2,879,154 | 3/1959 | Campbell | 75/0.5 BA |
| 2,963,360 | 12/1960 | Cobel et al. | 75/3 |
| 3,185,563 | 5/1965 | Jones et al. | 75/3 |
| 3,558,371 | 1/1971 | Becker | 148/31.57 |
| 3,607,219 | 9/1971 | Giessen et al. | 148/31.57 |
| 3,626,124 | 12/1971 | Denes | 148/31.57 |
| 3,653,875 | 4/1972 | Waters et al. | 75/33 |
| 4,050,962 | 9/1977 | Koester et al. | 75/0.5 BA |
| 4,072,501 | 2/1978 | Quinby | 75/0.5 BA |
| 4,155,748 | 5/1979 | Steck et al. | 75/0.5 BA |

FOREIGN PATENT DOCUMENTS 438692   1/1975   U.S.S.R. ................................. 75/5

*Primary Examiner*—Michael L. Lewis
*Attorney, Agent, or Firm*—Robert G. Clay; Robert G. Slick; Joel D. Talcott

[57] ABSTRACT

Highly orientable acicular iron particles are made by reducing an acicular ferric oxide which has been formed into a porous matrix by combining it with sodium tripolyphosphate and reducing the oxide with hydrogen in the presence of a dehydrating agent.

8 Claims, No Drawings

ECONOMICAL PROCESS FOR PRODUCING METAL PARTICLES FOR MAGNETIC RECORDING

REFERENCE TO RELATED APPLICATION

This application is a continuation-in-part of application Ser. No. 89,783 filed Oct. 31, 1979, which is a continuation of Ser. No. 8,948, filed Feb. 2, 1979, now abandoned.

SUMMARY OF THE INVENTION

The magnetic particles used in making magnetic recording elements, such as magnetic tapes, generally consist of acicular γ ferric oxide. It has long been recognized that iron itself would be superior to γ ferric oxide with respect to signal-to-noise ratio, magnetic moment and coercive force.

Iron particles have not been used to any great extent in magnetic recording, despite the obvious advantages of iron, for the reason that in preparing the iron particles by known processes, the particles frequently do not have the desired acicular shape and therefore are difficult to orient.

Chemical reduction processes have been used to prepare pure iron particles but the product may not have the desired acicular shape, and furthermore, the process is extremely expensive to carry out. The iron particles do not fit well into established procedures for processing pigments and preparing tapes or other magnetic storage media.

Others have proposed gaseous reduction methods of iron oxide particles but such processes ordinarily result in a metallic alloy pigment which does not lend itself to being magnetically oriented. Presumably, such gaseous reduction processes result in sintering and the destruction of the desired acicular shape of the iron particles.

The direct reduction of iron oxide with hydrogen presents two problems. One is that the iron oxide forms a compact mass and it is difficult to secure intimate contact between the solid oxide and hydrogen. The other is that the process is very wasteful of expensive hydrogen; as the oxide reacts with hydrogen, water is formed which inhibits the reaction.

In accordance with the present invention, a method is provided for rendering a magnetic iron oxide precursor suitable for gaseous solid state reduction to a metallic magnetic alloy pigment of high energy and which can be incorporated into a magnetic tape coating formulation with a high degree of magnetic orientability.

The first aspect of the present invention provides a method whereby an iron oxide particle having the desired shape is coated with an inorganic surfactant layer, i.e. sodium tripolyphosphate, and dried. This has the following advantages:

(a) keeps particles separated;
(b) prevents inter particle sintering by mass diffusion, and
(c) sets up a material matrix.

After standard solid state gaseous reduction, this material is in the form of a magnetic metallic alloy and exhibits and/or possesses:

(a) a higher degree of magnetic orientation when incorporated into a magnetic storage medium than material which is untreated or treated with other organic materials;
(b) mechanical integrity in the form of a material matrix when still in the pigment state just after reduction;
(c) a phosphate residue which is compatible with formulations used for incorporating magnetic pigments into various information storage formats, and
(d) a high degree of stability in the pigment form or final storage format.

Such a surfactant layer is assumed to be caused by a certain bonding between phosphorous and iron ions through the oxygen ions, although this invention is not predicated on any theory of operation. The thus coated material can then be subjected to a solid state gaseous reduction in the presence of hydrogen, as is later described in detail, to provide a magnetic metal or metallic alloy which possesses a high degree of magnetic orientation when formulated into tape. The matrix also makes it easy to separate the spent desiccant from the reacted mass since the matrix particles are much coarser than the desiccant particles and the latter may be removed by sifting. This matrix can be easily ground up to release the particles, and, in fact, the normal grinding of the pigment in the manufacture of magnetic tapes is adequate for this purpose so that a separate grinding step is not necessary. The amount of the matrix material is so small that it does not degrade the tape characteristics.

The second aspect of the present invention is to provide a desiccating agent in the reduction apparatus. By absorbing water of reaction as it is formed, the utilization of hydrogen is greatly enhanced, making the process more economically feasible. Further, the reaction time and/or temperature can be reduced and the reaction goes more nearly to completion.

As desiccants, calcium hydride, calcium carbide, metal calcium or mixtures thereof can be used. The preferred desiccant is calcium metal which is effective and inexpensive. Another effective desiccant is a mixture of calcium hydride and calcium metal in a ratio of from about 3 to 1 to 1 to 3.

The reduction of the iron oxide particles forms a part of the present invention, and generally it can be said that the starting materials can be either red or yellow acicular ferric oxide or acicular γ ferric oxide, and these are reduced to metallic iron in a stream of hydrogen gas in the presence of a desiccant.

Normally about two parts by weight of desiccant are used per part of the iron oxide starting material (2:1) although this ratio is not critical and wide departures can be made; e.g., ratios of 0.65:1 to 3:1. Preferably this is conducted at a relatively low temperature to prevent sintering and to preserve the acicular particle shape. Normally, the temperature must not be over 450° C. and preferably is not over 340° C. There is no lower limit as to the temperature except that the temperature must be high enough to make the reaction go fast enough to be economically feasible. Normally the minimum practical temperature of the conversion is about 275° C.

In carrying out the process, the iron oxide starting material is first stirred with an aqueous solution of sodium tripolyphosphate, then filtered and dried. The proportion of the sodium tripolyphosphate to the iron oxide can vary from ½ to 10% by weight and preferably is about 4%. In many instances, it is preferred to repeat the treatment prior to reduction. Thus, one can treat with the solution, dry the product, and then treat again with the solution, followed by a second filtration and drying and subsequent reduction.

The dry matrix thus produced is then placed in a heated reaction vessel in the presence of the desiccant and hydrogen is passed through the vessel.

Maximum utilization is obtained of the desiccant when a continuous feed process reduction is carried out using counter-current flow. Thus, incoming iron oxide is in proximity with used desiccant at one end of the system, while almost completely reduced iron is in proximity with fresh desiccant. Alternate embodiments employ counter-current batch processing where in a series of stages fresh iron oxide is treated with used desiccant at a first stage and last stage iron reduction is carried out in the presence of fresh desiccant. However, the benefits of the invention can be obtained to a large extent even in a batch process.

DESCRIPTION OF THE PREFERRED EMBODIMENTS

The following non-limiting examples illustrate various preferred embodiments of the present invention. In each instance the starting material was $\gamma$ $Fe_2O_3$ which had an average particle size of 1.0 micron by 0.15 micron. To 300 grams of the $\gamma$ ferric oxide, there was added a solution consisting of 7 liters of pure water with 12 grams of sodium tripolyphosphate dissolved therein. This was placed in a mixer and mixed overnight. The resulting mixture was then filtered to produce a moist filter cake and this was dried by placing it in a drying oven at 100° C. overnight. The dried material was then mixed with the desiccant, if used, and placed in a porcelain combustion boat in an electric furnace, and hydrogen gas introduced into the tube. After the tube had been purged with hydrogen gas for ten minutes, the tube was heated to a temperature and for a time period as set forth in the examples. At the end of this time, the product is allowed to cool to room temperature and oxygen is slowly introduced in the presence of an inert gas; this stabilizes the material.

EXAMPLE 1
(control—no desiccant)

Sodium tripolyphosphate treated $\gamma$-$Fe_2O_3$ reduced in $H_2$.
  Weight of sodium tripolyphosphate treated $\gamma$ $Fe_2O_3 = 4.2$ gm
  Hydrogen flow rate = 16 cu ft/hr.
  Reduction time = 9 hours
  Reduction temperature = 340° C.
  Tape magnetics: Br/Bs = 0.80; Hc = 960 Oe

EXAMPLE 2

Sodium tripolyphosphate treated $\gamma$ $Fe_3O_3$ reduced in the presence of $CaH_2$ and hydrogen.
  Weight of sodium tripolyphosphate treated $\gamma$ $Fe_2O_3 = 4.4$ gm
  Wt. of $CaH_2 = 8.8$ gm
  Hydrogen flow rate = 2 cu. ft/hr.
  Reduction time = 7 hours
  Reduction temperature = 340° C.
  Tape magnetics: Br/Bs = 0.79–0.80; Hc = 970 Oe The above examples show that the hydrogen flow rate can be reduced by a factor of 8 and the reaction time reduced by employing calcium hydride.

EXAMPLE 3

Sodium tripolyphosphate treated $\gamma$ $Fe_2O_3$ reduced in the presence of $CaH_2$ and hydrogen.
  Weight of sodium tripolyphosphate treated $\gamma$ $Fe_2O_3 = 250$ gm
  Wt. of $CaH_2 = 500$ gm
  Hydrogen flow rate = 2 cu. ft/hr.
  Reduction time = 12 hours
  Reduction temperature = 340° C.
  Tape magnetics: Br/Bs = 0.77–0.80; Hc = 900 Oe

EXAMPLE 4

As received $\gamma$ $Fe_2O_3$ reduced in $H_2$ only. Ratios of $CaH_2/Fe_2O_3$ from 0.65 to as much as 3/1 have been utilized and reduce the hydrogen consumption by 85% to 90%. Further, the ideal ratio of $CaH_2$ to $\gamma$ $Fe_2O_3$, which is 2/1, allows for repeated use of $CaH_2$ and has been successfully reused for up to three reductions.

EXAMPLE 5

Sodium tripolyphosphate treated $\gamma$ $Fe_2O_3 = 5.5$ gm
Weight of $CaH_2 = 11$ gm
Reduction time = 8 hours
Reduction temperature = 340° C.
$H_2$ flow rate = 2 cu. ft/hr.
Tape magnetics: Br/Bs = 0.78; Hc = 980

EXAMPLE 6

Weight of sodium tripolyphosphate treated $\gamma$ $Fe_2O_3 = 5.3$ gm
Weight of $CaH_2 = 11$ gm
Reduction time = 8 hours
Reduction temperature = 340° C.
$H_2$ flow rate = 2 cu. ft/hr.

EXAMPLE 7

Same as Example 5 using same $CaH_2$ as in 6 (third use). The oxide was reduced to only 88% of completion use. Some operating condition as Example 5. Complete reduction can be obtained using somewhat longer reduction times.

The above examples show that the calcium hydride can be reused several times with little loss of efficiency.

EXAMPLE 8

Sodium tripolyphosphate treated $\gamma$ $Fe_2O_3$ reduced in the presence of $CaH_2$ and $H_2$ in a rotating kiln with counter-current flow of iron oxide and desiccant:
  Kiln charge 5 Kg $CaH_2$ 2.5 Kg Sodium Tripolyphosphate $\gamma$ $Fe_2O_3$
  $H_2$ flow rate: 8 CFH
  Temperature: 330° C.
  Reduction time: 19 hours
  Tape Magnetic Hc: 950 Oe; Br/Bs 0.78–0.80

EXAMPLE 9

2.5 Kg of $\gamma$ ferric oxide was mixed with 3.15 Kg of calcium hydride and 1.05 Kg of calcium. The oxide was then reduced at 330° C. with hydrogen, flow rate 10 CFH, for 72 hours. The resulting product was cooled, stabilized and evaluated both as to the particles per se and magnetic tapes made from the particles.

EXAMPLE 10

2.5 Kg of $\gamma$ ferric oxide was mixed with 2.15 Kg of calcium and 2.1 Kg of calcium hydride. This material was reduced at 330° C. with hydrogen, flow rate 10 CFH, for 72 hours. The resulting product was cooled, stabilized and evaluated as in Example 1.

EXAMPLE 11

2.5 Kg of γ ferric oxide was mixed with 3.15 Kg of calcium and 1.05 Kg of calcium hydride. The oxide was reduced at 330° C. using hydrogen gas, flow rate 10 CFH, for 51 hours. The resulting product was cooled, stabilized and evaluated as in Example 1.

EXAMPLE 12

2.5 Kg of γ ferric oxide was mixed with 4.2 Kg of calcium. This material was reduced at 330° C. with hydrogen, flow rate 10 CFH, for 73 hours. The resulting product was cooled, stabilized and evaluated as in Example 1.

EXAMPLE 13

2.5 Kg of γ ferric oxide was mixed with 3.15 Kg of calcium and 1.05 Kg of calcium carbide. The oxide was reduced at 330° C. with hydrogen, flow rate 10 CFH, for 72 hours. The resulting product was cooled, stabilized and evaluated as in Example 1.

The magnetic properties of the metallic iron particles made in accordance with the foregoing examples 9–13 were measured and also samples of the various iron particles were combined with a resin binder and used to make a magnetic tape. The properties of the tape were measured. The following results were obtained, both on the iron particles as made in accordance with the foregoing examples and also with practical magnetic tapes fabricated and utilizing these particles.

| Example No. | Desiccant/ Reductant (Weight Ratio) | MAGNETIC RESULTS | | | | |
|---|---|---|---|---|---|---|
| | | *Powder Properties | | | **Tape Properties | |
| | | Hc(oe) | σS (Emu/g) | Squareness (Br/Bs) | Hc (oe) | Squareness |
| 9 | $CaH_2/Ca$ (3/1) | 999 | 148 | 0.47 | 960 | 0.81 |
| 10 | $CaH_2/Ca$ (1/1) | 966 | 138 | 0.45 | 917 | 0.80 |
| 11 | $CaH_2/Ca$ (⅓) | 965 | 136 | 0.45 | 932 | 0.79 |
| 12 | Ca | 1011 | 140 | 0.46 | 939 | 0.79 |
| 13 | $Ca/CaC_2$ (3/1) | 999 | 148 | 0.47 | 960 | 0.81 |

*$H_{app}$: 8Koe D.C.
**$H_{app}$: 5Koe D.C.

We claim:

1. In the process of reducing an acicular iron oxide to produce acicular metal particles suitable for magnetic recording, the improvement comprising treating the oxide particles with an aqueous solution of sodium tripolyphosphate, drying the thus coated oxide to produce a matrix and reducing the oxide by subjecting the matrix to contact with hydrogen at an elevated temperature in the presence of a dehydrating agent selected from calcium metal, calcium metal with calcium hydride and calcium metal with calcium carbide.

2. The process of claim 1 wherein the proportion of the dehydrating agent to the iron oxide matrix is 2 to 1 by weight.

3. The process of claim 1 wherein the proportion of the dehydrating agent to the iron oxide matrix is 0.65:1 to 3:1 by weight.

4. The process of claim 1 wherein the iron oxide is γ ferric oxide.

5. The process of claim 1 wherein the dehydrating agent is calcium metal.

6. The process of claim 1 wherein the dehydrating agent is a calcium hydride and calcium metal mixture.

7. The process of claim 1 wherein the dehydrating agent is a calcium carbide and calcium metal mixture.

8. The process of claim 1 operated as a continuous process with the oxide particles and dehydrating agent moving in counter-current flow through a heated reaction zone.

* * * * *